United States Patent [19]
Geyer et al.

[11] Patent Number: 5,928,459
[45] Date of Patent: Jul. 27, 1999

[54] PROCESS FOR THE PRODUCTION OF POLYMETHACRYLIMIDE FOAM MATERIALS

[75] Inventors: Werner Geyer, Muehltal; Hermann Seibert, Kaiserslautern; Sabine Servaty, Weiterstadt, all of Germany

[73] Assignee: Roehm GmbH Chemische Fabrik, Darmstadt, Germany

[21] Appl. No.: 09/066,776

[22] Filed: Apr. 27, 1998

[30] Foreign Application Priority Data

Apr. 25, 1997 [GB] United Kingdom .............. 197 17 483

[51] Int. Cl.$^6$ .............................. C08J 4/00; C08J 101/00; C08J 201/00; B05D 5/00
[52] U.S. Cl. ...................................... 156/331.1; 156/330.9; 156/331.2; 427/244; 521/117; 521/125; 521/128; 521/145; 521/149; 521/150; 521/183
[58] Field of Search ..................................... 521/149, 125, 521/150, 183, 128, 117, 145

[56] References Cited

U.S. PATENT DOCUMENTS

| | | | |
|---|---|---|---|
| 3,627,711 | 12/1971 | Schroeder et al. | 521/94 |
| 4,139,685 | 2/1979 | Schroeder et al. | 521/149 |
| 4,187,353 | 2/1980 | Schroeder et al. | 521/149 |
| 4,576,971 | 3/1986 | Baumgartner et al. | 521/149 |
| 4,665,104 | 5/1987 | Bitsch | 521/145 |
| 4,996,109 | 2/1991 | Krieg et al. | 521/149 |
| 5,698,605 | 12/1997 | Krieg et al. | 521/149 |

*Primary Examiner*—Morton Foelak
*Attorney, Agent, or Firm*—Oblon, Spivak, McClelland, Maier & Neustadt, P.C.

[57] ABSTRACT

Polymethacrylimide foams are prepared by a method, comprising:

preparing a mixture consisting of
  (a) a monomer mixture of 40–60 wt. % methacrylonitrile, 60–40 wt. % methacrylic acid, and, optionally, up to 20 wt. %, based on the sum of methacrylic acid and methacrylonitrile, of other monofunctional, vinyl-unsaturated monomers,
  (b) 0.5–8 wt. % of a propellant mixture of formamide or monomethyl formamide and a univalent $C_{3-8}$-aliphatic alcohol,
  (c) a cross-linking agent system, which consists of
    (c.1) 0.005–5 wt. % of a vinyl-unsaturated compound which can be radically polymerized, with at least two double bonds in the molecule, and
    (c.2) 1–5 wt. % magnesium oxide, dissolved in the monomer mixture, and at least one radical initiators and optionally at least one additive, shaped in the form of a sheet;

polymerizing the monomers in the sheet;

subsequently foaming the polymerizate sheet at temperatures from 200–260° C.; and then heat treating the sheet in two steps, at a first step of 2–6 hours at 100–130° C. and a second step of 32–64 hours at 180–220° C.

14 Claims, No Drawings

PROCESS FOR THE PRODUCTION OF POLYMETHACRYLIMIDE FOAM MATERIALS

BACKGROUND OF THE INVENTION

1. Field of the Invention

The invention relates to polymethacrylimide foams with improved thermomechanical properties.

2. Description of the Background

Polymethacrylimides having a high level of heat shape retention can be prepared by reaction of polymethyl methacrylate or its copolymers with primary amines. Representative publications of the large number of publications which disclose polymer-analog imidization include U.S. Pat. No. 4,246,374, EP 216 505 and EP 860 821. Further, JP 05222119 discloses that a polymer imidized with aryl amines have a high level of heat shape retention, while EP 561 230 and EP 577 002 disclose that this characteristic can be achieved by formulating the copolymer using special comonomers. All of these reactions, however, do not produce foams, but rather solid polymers, which must be foamed in a separate, second step in order to obtain a foam.

Polymethacrylimide foams have been known for a long time as disclosed, for example, in DE 27 26 260. They have been widely used, for example, as the core material for layered materials or foam laminates, because of their good pressure resistance and their low weight as disclosed in DE 28 22 885, DE 33 04 882 and U.S. Pat. No. 4,316,934.

Particularly in connection with the production of sandwich components with cover layers made of carbon fiber/bismaleinimide (CF/BMI) prepregs, there are high requirements with regard to mechanical stability at high temperatures. Typically, such components are first cured in an autoclave (several hours at up to 200° C.), and then additionally tempered for several hours at approximately 240° C. These extreme conditions can only be met by hard foams which demonstrate good heat shape retention and good creep behavior.

EP 532 023 A1 describes poly(meth)acrylimide foams having good heat shape retention and a uniform cell structure, which are obtained by heating polymers prepared from a) 5–50% tert.-butyl (meth)acrylate and 50–95% of a mixture of b) methacrylic acid and c) methacrylonitrile. In addition to the fact that when the polymer is heated, decomposition of the polymer occurs to the extent that isobutene is discharged therefrom, which is problematical for safety reasons, these foams particularly do not possess the high level of heat shape retention which is required for the production of laminate materials.

The required high level of heat shape retention is also not achieved by the products described in DE 18 17 156, which are obtained by foaming polymerizate sheets which consist of a) a polymerizate of at least 20 wt. % acrylic or methacrylic acid and, if necessary, one or more other unsaturated monomers, generally acrylonitrile or methacrylonitrile, and b) formamide or monoalkyl formamide. While it is mentioned in the specification that further improvements in properties can supposedly be achieved by the use of lower proportions of compounds with at least two reactive groups in the molecule, this is not documented with examples.

Another improvement in the material properties and particularly in the ability to produce imide foams is described in DE 27 26 260. By using 0.01–5 wt. % metal salts of acrylic and/or methacrylic acid, the task of being able to produce foams with a homogeneous cell structure and high density with non-reduced propellant amounts, even at high foaming temperatures, is accomplished. High foaming temperatures are absolutely necessary for good mechanical strength of the foam when it is later subjected to temperature stress in use, but if the propellant amount is unchanged, foaming is too strong and, therefore, the density is too low. Therefore, it has been possible to produce imide foams which are able to withstand thermal stress only by greatly reducing the amount of propellant, with a resulting loss of homogeneity of the cell structure.

The surprising effect of the metal salts is that it is possible to produce homogeneous imide foams with high density in their presence, with non-reduced propellant amounts, even at high foaming temperatures, is explained by reversible ionic cross-linking of the (meth)acrylic acid units with the metal ions. The salts obviously hinder foaming of the polymer, because of their bridging effect between the molecules, and thereby counteract the propellant.

However, no teaching is disclosed with regard to the heat shape retention of the imide foams as a function of the use of the metal salts of acrylic or methacrylic acid, and in the discussion of the examples and the tables, the foam density is only shown to be a function of the foaming conditions and the metal salt content. While it is true that in one case, an imide foam with heat shape retention at 246° C. and a pressure strength of 5 N/mm is achieved by the use of chromium-III-dimethacrylate hydroxide, the use of such a toxic and ecologically unsafe metal salt is no longer in keeping with the times, and suitable alternatives are needed. Covalent, non-reversible cross-linking by means of multi-functional vinyl-unsaturated compounds is not mentioned in the patent.

DE 35 19 005 A1 discloses an improved polymethacrylimide foam, which is characterized by advantageous creep behavior at high temperatures and by a slight change in creep behavior when stored in humid air. This is achieved by heating a plastic, consisting of a mixed polymerizate of 47–53 wt. % methacrylonitrile, 53–47 wt. % methacrylic acid, and 0.01–4 wt. % of a metal salt of acrylic and/or methacrylic acid, as well as 0.5–4 wt. % of a propellant mixture of formamide or monomethyl formamide and a univalent aliphatic alcohol with 3–8 carbon atoms in the molecule, to temperatures of 200–240° C. This significantly improves both the change in the creep behavior of the plastic in humid air and the water absorption of the plastic when stored in water. The use of additional comonomers is generally described as causing a worsening of the intended properties and is, therefore, not recommended.

Unpublished German Application No. 19606530.5 describes polymethacrylimide foams having improved flame protection. To obtain high values for the so-called lower limit for oxygen concentration, which is indicated in the form of LOI values (Lowest Oxygen Index), a high concentration of conventional flame protectants previously have had to be added, which necessarily causes a clear deterioration of the mechanical properties of the flame-protected foams. In accordance with the teaching of this application, the loss in properties usually caused by the high concentration of flame protectant can be circumvented by additionally adding an epoxy resin to the reaction mixture for production of the foamable polymerizate sheet, in addition to a relatively small amount of a conventional flame protectant. Because the concentration of additives is clearly reduced, in total, higher LOI values of at least 25 can be achieved while the material properties are not significantly worse. While it is true that the use of metal salt additives, metal salts of acrylic and methacrylic acid, as well as small amounts of cross-linking agents, is described, the values for heat shape retention, at less than 210° C., which are achieved in accordance with this invention, are clearly too low for the requirements of the present application.

SUMMARY OF THE INVENTION

Accordingly, one object of the present invention is to provide polyacrylimide foams of improved thermomechanical properties and low density.

Briefly, this object and other objects of the present invention as hereinafter will become more readily apparent can be attained in a process for the production of polymethacrylimide foams, comprising:

(i) preparing a mixture consisting of
  (a) a monomer mixture of 40–60 wt. % methacrylonitrile, 60–40 wt. % methacrylic acid, and, optionally, up to 20 wt. %, based on the sum of methacrylic acid and methacrylonitrile, of other monofunctional, vinyl-unsaturated monomers,
  (b) 0.5–8 wt. % of a propellant mixture of formamide or monomethyl formamide and a univalent $C_{3-8}$-aliphatic alcohol,
  (c) a cross-linking agent system, which consists of
    (c.1) 0.005–5 wt. % of a vinyl-unsaturated compound which can be radically polymerized, with at least two double bonds in the molecule, and
    (c.2) 1–5 wt. % magnesium oxide, dissolved in the monomer mixture, and at least one radical initiator and optionally at least one additive, shaped in the form of a sheet;

(ii) polymerizing the monomers in the sheet;

(iii) subsequently foaming the polymerizate sheet at temperatures from 200–260° C.; and then (iv) heat treating the sheet in two steps, at a first step of 2–6 hours at 100–130° C. and a second step of 32–64 hours at 180–220° C.

DETAILED DESCRIPTION OF THE PREFERRED EMBODIMENTS

The objective of the invention is to make available polymethacrylimide foams having low density and clearly improved thermomechanical properties, with a heat shape retention that is as high as possible, i.e. if possible greater than 230° C., preferably greater than 240° C., and especially preferably greater than 250° C., and which demonstrate a creep behavior that has not been achieved until now, after 2–4 hours of temperature stress at 180–200° C. under simultaneous pressure stress at 0.2–0.7 MPa. These properties are absolutely necessary if the foams are to be suitable for use as core materials for the production of sandwich components with cover layers of carbon fiber/bismaleimide, i.e. under the conditions of autoclave curing, i.e. typically 4–6 hours at 180–200° C. and 5–7 MPa autoclave interior pressure, and if no layer separation between the core and the cover layer of the prepreg, which has been produced, is to take place under the usual subsequent curing for typically 6–16 hours at 220–240° C. In order to meet this prerequisite, the creep behavior of the foam, characterized as compression, which is obtained in a creep pressure test in accordance with DIN 53 425 at constant temperature, must be better than 3%.

By means of the process of the invention, polymethacrylimide foams with clearly improved mechanical properties can be obtained. The polymethacrylimide foams produced of the present process not only possess a higher level of heat shape retention than the previously known products of the art, they particularly demonstrate better compression behavior under the simultaneous effect of pressure and temperature.

In this connection, it was completely unexpected that the combination of a clearly increased content of metal salt of methacrylic acid, in comparison to the amount of salts previously used in the state of the art (with the same weight ratio of magnesium oxide and magnesium methacrylate, the corresponding molar ratios are approximately 5:1), and an additional cross-linking agent on the basis of a multifunctional vinyl-unsaturated compound, would even lead to a polymerizate which could be foamed.

Polymethacrylimide foams are characterized by recurring units with the structure

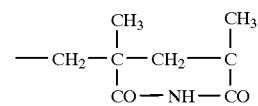

which comprise more than 50 wt. %, preferably 60–90 wt. % of the units of the polymerizate. The units form when the polymerizate is heated to 150–250° C., from adjacent units of methacrylic or acrylic acid and methacrylonitrile, by means of a cyclizing isomerization reaction (cf. DE 18 17 156, DE 27 26 259, EP 146 892). Usually, a pre-product is first formed by polymerization of the monomers in the presence of a radical initiator, at low temperatures, for example 30–60° C., with subsequent heating to 60–120° C., which is then foamed, in a second step, by means of the propellant which is present when heated to approximately 200–260° C. (see EP 356 714).

The monomer mixtures used for production of the foams (a) contain methacrylic acid and methacrylonitrile in a weight ratio between 40:60 and 60:40, preferably in a weight ratio between 47:53 and 53:47, and especially preferably in a weight ratio between 49:51 and 51:49 as the main components. Since conversion of the polymerized monomers into methacrylimide groups does not always proceed completely during heating of the reaction mixture and foaming, the polymerizates frequently also contain small amounts of the monomer units originally used, or also carboxylic acid amide groups formed from the nitrile, which were not converted into imides by cyclization.

Other non-imide-like units can result from additional other monofunctional, vinyl-unsaturated monomers which are also used, whose polymerized units are more difficult or impossible to convert into cyclic imide groups. For example, acrylic acid, esters of acrylic or methacrylic acid, particularly of lower alcohols of 1–4 carbon atoms, styrene, maleic acid or its anhydride, itaconic acid or its anhydride, vinyl pyrrolidone, vinyl chloride, or vinylidene chloride, can be used as comonomers. The amount of comonomers can range from 0–20 wt. %, preferably 0–10 wt. %, and especially preferably 0–1 wt. %, with reference to the sum of methacrylic acid and methacrylonitrile.

To foam the pre-product during conversion into a polymer that contains imide groups, mixtures of propellants (b) are used, in known manner, which form a gas phase at 150–250° C., by decomposition or evaporation. Propellants having an amide structure such as urea, monomethyl or N,N'-dimethyl urea, formamide or monomethyl formamide, release ammonia or amines as they decompose, which can contribute to the additional formation of imide groups. The nitrogen-free propellants which are also used, according to the invention, can consist of: fumaric acid, water, or univalent aliphatic alcohols with 3–8 carbon atoms in the molecule such as propanol, butanol, isobutanol, pentanols, or hexanol. Propellants are usually used in the reaction mixture in amounts of approximately 0.5–8 wt. %, preferably 0.7–6 wt. %, with reference to the monomers (a) used.

The component (c.1) of the cross-linking agent system consists of a vinyl-unsaturated compound which can be radically polymerized, with at least two double bonds in the molecule.

Generally speaking, vinyl-unsaturated compounds with at least two allyl groups or at least two methacryl or acryl groups can be used as covalent cross-linking agents (c.1); likewise, compounds which contain a combination of allyl and (meth)acryl groups and are at least bifunctional with regard to cross-linking are also advantageous.

Suitable examples of cross-linking agents include allyl acrylate, allyl methacrylate, allyl acrylamide, allyl methacrylamide, methylene-bis-acrylamide or methacrylamide, diethylene (bis)allylcarbonate, ethyleneglycol diacrylate or dimethacrylate, diethyleneglycol diacrylate or dimethacrylate, triethyleneglycol diacrylate or dimethacrylate, tetraethylene glycol diacrylate or dimethacrylate, tripropyleneglycol diacrylate or dimethacrylate, 1,3-butanediol diacrylate or dimethacrylate, 1,4-butanediol diacrylate or dimethacrylate, neopentyldiol diacrylate or dimethacrylate, hexane diol-1,6-diacrylate or dimethacrylate, trimethylolpropane diacrylate or dimethacrylate, trimethylolpropane triacrylate or trimethacrylate, pentaerythritoltriacrylate or trimethacrylate, pentaerythritoltetraacrylate or tetramethacrylate. The pentaerythritol derivatives, if necessary also as a technical mixture of tri-functional and tetra-functional compounds, as well as triallyl cyanurate or triallyl isocyanurate, can be used as such monomers.

Allyl methacrylate and triallyl cyanurate are especially preferred.

The amount of the cross-linking agent normally ranges from 0.005–5, preferably 0.01–3, and very especially preferably 0.05–1 wt. %, based on the sum of methacrylic acid and methacrylonitrile.

According to the invention, the second component (c.2) of the cross-linking agent system (c) consists of magnesium oxide, which is dissolved in the monomer mixture. The monomer mixture used for dissolution can either consist solely of the components specified above as (a), or it may contain the components used for production of the polymerizate sheet. This results in magnesium methacrylate, as a homogeneous solution is formed, and if acrylic acid is also used, a corresponding amount of magnesium acrylate is also formed. However, multivalent metal salts of methacrylic acid such as magnesium methacrylate, can also be advantageously used as ionic cross-linking monomers, or other metal salt additives as taught in DE 27 26 260, i.e. the methacrylates of alkali or alkaline earth metals or of zinc or zirconium or lead or other compounds of the metals mentioned, as long as they are soluble in the monomer mixture. The normal amounts lie in the range of 0.01–15, preferably 0.02–12, and very especially preferably 0.05–10 wt. % of the metal salt (meth)acrylates, or, in the case when magnesium oxide is used, the normal amounts can be 0.01–15, 1–10, 1.1–5, 1.2–4, or 1.5–3 wt. %, based on the sum of methacrylic acid and methacrylonitrile. The range of 1–5 wt. % magnesium oxide is especially preferred.

With reference to the ratio between the ionic cross-linking methacrylate salt (c.2) and the covalent cross-linking multifunctional monomer (c.1), it has proven to be advantageous if the amount of covalent cross-linking agent is reduced at the same time as the amount of magnesium salt is increased. This can go so far that at very high weight amounts of the magnesium salt, the amount of cross-linking agent can be close to zero. In the same manner, it has been shown that at higher amounts of magnesium salt, it can generally be more advantageous to use allyl cross-linking agents instead of methacryl cross-linking agents. These dependencies have proven to be advantageous in most cases, but are not compulsory.

The polymerization initiators used are those usually used for polymerization of methacrylates, for example azo compounds such as azodiisobutyronitrile, as well as peroxides such as dibenzoyl peroxide or dilauryl peroxide, or also other peroxide compounds such as t-butyl peroctanoate, for example, or perketals, as well as redox initiators, if necessary (cf. in this regard H. Rauch-Puntigam, Th. Völker, Acryl- und Methacrylverbindungen [acryl and methacryl compounds], Springer, Heidelberg, 1967 or Kirk-Othmer, Encyclopedia of Chemical Technology, Vol. 1, pages 286 ff, John Wiley & Sons, New York, 1978). Preferably, the polymerization initiators are used in amounts of 0.01 to 0.3 wt. % based on the starting substances. It can also be advantageous to combine polymerization initiators with different decomposition properties with reference to time and temperature. For example, the simultaneous use of tert.-butyl perpivalate, tert.-butyl perbenzoate, and tert.-butyl per-2-ethyl hexanoate.

The usual additives which are also used in the production of the polymerizate sheet by means of radical polymerization, if necessary, can be polymerization regulators, electrically conductive particles, or flame protectants.

Thioglycolic acid, 2-mercaptoethanol, 2-ethylhexyl thioglycolate, butyl thioglycolate, butyl mercaptan, dodecyl mercaptan, tert.-dodecyl mercaptan, or pentaerythritol tetrathioglycolate, in the amounts usual for the polymerization of methacrylates, can advantageously be used as polymerization regulators.

Electrically conductive particles can be added to the composition as taught in EP 356 714, in order to prevent undesirable electrostatic charges. Here, particles of metals, such as aluminum, nickel, iron alloys, titanium, or tin, or even conductive carbon black, can be used. The amounts used can lie in the range of 0.1–10 wt. %, with reference to the monomers used, usually approximately 1–5 wt. % are used. Known halogen or phosphorus compounds are used as conventional flame protectant additives. Organic phosphorus compounds in accordance with EP 146 892 are preferred, preferably dimethylmethanphosphonate (DMMP). Usual amounts used lie in the range of approximately 5–15 wt. % with reference to the monomers used. When using increasing amounts of DMMP, for example, the other thermal and mechanical properties of the foams generally deteriorate.

Foaming of the polymerizate sheets produced in the first step of the process, by means of radical polymerization, takes place by heating at 200–260° C., preferably 225–260° C. It is advantageous if this process takes place in a heating cabinet, i.e. by means of transferring the amount of heat required for foaming through air. The energy required for foaming can also be transferred via other media, if necessary, for example by heating the sheet in contact with oil or with metals that melt at a low temperature. Likewise, the energy can be provided by means of the action of high-frequency electromagnetic fields, e.g. the effect of microwaves. Of course, the time required for complete foaming depends to a great extent on the amount of energy provided, i.e. the heat capacity of the medium used, and can, therefore, range from a few minutes to several hours. It is advantageous if the heat treatment conducted after foaming is conducted for the periods of time indicated, in a heating cabinet with air circulation.

Having generally described this invention, a further understanding can be obtained by reference to certain specific examples which are provided herein for purposes of illustration only and are not intended to be limiting unless otherwise specified.

EXAMPLES 1–4

The parts by weight (T) of methacrylic acid, methacrylonitrile, formamide, propanol-2, magnesium oxide (MgO), and allyl methacrylate or triallyl cyanurate indicated in the table in each instance, as well as 0.1 T tert.-butyl perpivalate, 0.1 T tert.-butyl perbenzoate, and 0.034 T tert.-butyl per-2-ethyl hexanoate, were mixed.

The mixture was polymerized in a water bath for 72 hours, at 38° C. between two sheets of glass with a sealing cord running around them, to form sheets with the dimensions 500×500×23 mm. The sheets were subsequently tempered in a heating cabinet with air circulation, at 115° C., for 3 hours. After the sheets of glass were removed, the polymerizate sheets obtained were foamed in a heating cabinet with air circulation, by heating them for 2 hours to approximately 230° C., and subsequently tempered in similar manner, at 115° C. for 3 hours, and 190° C. for 48 hours.

The density of the foam sheets was measured in kg/m$^3$, the pressure strength was determined according to DIN 53 421, the heat shape retention was determined in accordance with DIN 53 424 (Point 3), and the creep behavior was determined according to DIN 53 425/ASTM D 621, calculated as % compression.

The values determined are shown in the following table.

|  | Example No. | | | |
| --- | --- | --- | --- | --- |
|  | 1 | 2 | 3 | 4 |
| Methacrylic Acid/methacrylo nitrile (parts by weight) | 50/50 | 50/50 | 50/50 | 50/50 |
| Formamide (parts by weight) | 1.5 | 2.0 | 2.0 | 2.6 |
| Propanol-2 (parts by weight) | 3.8 | 2.0 | 2.0 | 2.6 |
| Magnesium oxide (parts by weight) | 1.0 | 1.5 | 1.5 | 2.0 |
| Allyl methacrylate (parts by weight) | 0.3 | 0 | 0 | 0 |
| Triallyl cyanurate (parts by weight) | 0 | 0 | 1.0 | 0 |
| Density (kg/m$^3$) | 69 | 68 | 7 | 67 |
| Heat shape retention | 245 | 256 | 262 | 267 |
| Creep behavior (4 hours 200° C., 0.35 MPa) | 1.6 | 0 | 0.7 | 0.6 |

*The amount of the methacrylic acid/methacryl amide mixture was selected in such a way that the sum of the components was 100 wt. %.

EXAMPLE 5

Polymethacrylimide foams having the composition of the invention as described in Example 3 were produced and measured with and without two-step tempering after foaming of the polymerizate sheet. The following strength values were achieved:

| Foam density [kg/m$^3$] | Test at 4 hours 190° C. | Compression in % | |
| --- | --- | --- | --- |
|  |  | untempered | tempered |
| 51 | 0.2 MPa | >12 after 30 min | 0.33 |
| 71 | 0.6 MPa | >12 after 21 min | 1.4 |
| 110 | 0.7 MPa | >12 after 42 min | 1.5 |

In the case of the untempered samples, the test was stopped at the time indicated when 12% compression was exceeded.

The disclosure of German priority application 197 17 483.3 filed Apr. 25, 1997 is hereby incorporated by reference.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A process for the production of polymethacrylimide foams, comprising:
   preparing a mixture consisting of
   (a) a monomer mixture of 40–60 wt. % methacrylonitrile, 60–40 wt. % methacrylic acid, and, optionally, up to 20 wt. %, based on the sum of methacrylic acid and methacrylonitrile, of other monofunctional, vinyl-unsaturated monomers,
   (b) 0.5–8 wt. % of a propellant mixture of formamide or monomethyl formamide and a univalent $C_{3-8}$-aliphatic alcohol,
   (c) a cross-linking agent system, which consists of
      (c.1) 0.005–5 wt. % of a vinyl-unsaturated compound which can be radically polymerized, with at least two double bonds in the molecule, and
      (c.2) 1–5 wt. % magnesium oxide, dissolved in the monomer mixture, and at least one radical initiator and optionally at least one additive, shaped in the form of a sheet;
   polymerizing the monomers in the sheet;
   subsequently foaming the polymerizate sheet at temperatures from 200–260° C.; and then
   heat treating the sheet in two steps, at a first step of 2–6 hours at 100–130° C. and a second step of 32–64 hours at 180–220° C.

2. The process of claim 1, wherein the weight ratio of in (a) of methacrylic acid to methacrylonitrile ranges from 47:53–53:47.

3. The process of claim 1, wherein the vinyl-unsaturated compound (c.1) is a member selected from the group consisting of allyl acrylate, allyl methacrylate, allyl acrylamide, allyl methacrylamide, methylene-bis-acrylamide or methacrylamide, diethylene (bis)allylcarbonate, ethyleneglycol diacrylate or dimethacrylate, diethyleneglycol diacrylate or dimethacrylate, triethyleneglycol diacrylate or dimethacrylate, tetraethylene glycol diacrylate or dimethacrylate, tripropyleneglycol diacrylate or dimethacrylate, 1,3-butanediol diacrylate or dimethacrylate, 1,4-butanediol diacrylate or dimethacrylate, neopentyldiol diacrylate or dimethacrylate, hexanediol-1,6-diacrylate or dimethacrylate, trimethylolpropane diacrylate or dimethacrylate, trimethylolpropane triacrylate or trimethacrylate, pentaerythritoltriacrylate or trimethacrylate and pentaerythritoltetraacrylate or tetramethacrylate.

4. The process of claim 1, wherein said amount of vinyl-unsaturated compound ranges from 0.01–3 wt. %.

5. The process of claim 1, wherein said copolymerizable monofunctional, vinyl-unsaturated comonomer (a) is a member selected from the group consisting of acrylic acid, esters of acrylic or methacrylic acid, styrene, maleic acid, maleic anhydride, itaconic acid, itaconic anhydride, vinyl pyrrolidone, vinyl chloride and vinylidene chloride.

6. The process of claim 5, wherein the amount of said copolymerizable comonomer (a) ranges from 0–20 wt. % based on the amount of methacrylic acid and methacrylonitrile.

7. The process of claim 6, wherein said amount of comonomer ranges from 0–10 wt. %.

8. A polymethacrylimide foam which is prepared by the process of claim 1.

9. The polymethacrylimide foam of claim 7, which has a heat shape retention greater than 250° C.

10. The polymethacrylimide foam of claim 8, which demonstrates a maximum compression of 3% after a temperature stress of 200° C. for 4 hours, and simultaneous pressure stress of 0.2–0.7 MPa.

11. The polymethacrylimide foam of claim 10, which demonstrates a maximum compression of 2% after a temperature stress of 200° C. for 4 hours, and simultaneous pressure stress of 0.2–0.7 MPa.

12. A prepreg having a core of a polymethacrylimide foam prepared by the process of claim 1.

13. The prepreg of claim 12, which is prepared by curing a core material at 180–200° C. for 4–6 hours under a pressure of 5–7 MPa.

14. A method of preparing sandwich components, comprising:

sandwiching the polymethacrylimide foam according to claim 1 between cover layers of carbon fiber/bismaleinimide.

* * * * *

UNITED STATES PATENT AND TRADEMARK OFFICE
CERTIFICATE OF CORRECTION

PATENT NO. : 5,928,459
DATED : July 27, 1999
INVENTOR(S) : Werner GEYER, et al.

It is certified that error appears in the above-identified patent and that said Letters Patent is hereby corrected as shown below:

On the title page, item [30] should be:

--[30]     Foreign Application Priority Data
       Apr. 25, 1997 [DE] Germany ............ 197 17 483--

Signed and Sealed this

Thirteenth Day of June, 2000

Attest:

Q. TODD DICKINSON

*Attesting Officer*      *Director of Patents and Trademarks*